(12) United States Patent
Yano et al.

(10) Patent No.: US 7,380,636 B2
(45) Date of Patent: Jun. 3, 2008

(54) NOISE REDUCING EQUIPMENT

(76) Inventors: Hiroshi Yano, Kawasaki Heavy Industries, Ltd. 1-1, Kawasaki-cho, Akashi (JP); Mitsuaki Oda, Kawasaki Heavy Industries, Ltd., 1-1, Kawasaki-cho, Akashi (JP); Yoshinori Kanehana, Kawasaki Heavy Industries Ltd., 1-1, Kawasaki-cho, Akashi (JP); Yoji Hosoe, Kawasaki Heavy Industries Ltd., 1-1, Kawasaki-cho, Akashi (JP)

( * ) Notice: Subject to any disclaimer, the term of this patent is extended or adjusted under 35 U.S.C. 154(b) by 210 days.

(21) Appl. No.: 11/201,846

(22) Filed: Aug. 10, 2005

(65) Prior Publication Data

US 2005/0263343 A1    Dec. 1, 2005

(51) Int. Cl.
B64F 1/26 (2006.01)
E04B 1/00 (2006.01)
E04B 9/00 (2006.01)

(52) U.S. Cl. ............................... 181/210; 181/285

(58) Field of Classification Search ............... 181/210, 181/285, 295; 244/114 B; 105/452; 295/7; 52/144, 145
See application file for complete search history.

(56) References Cited

U.S. PATENT DOCUMENTS

| | | | | |
|---|---|---|---|---|
| 4,158,401 A | * | 6/1979 | Matsumoto et al. | 181/210 |
| 4,436,179 A | * | 3/1984 | Yamamoto et al. | 181/210 |
| 5,678,364 A | * | 10/1997 | Shima et al. | 52/169.3 |
| 5,739,482 A | * | 4/1998 | Shima et al. | 181/210 |
| 5,919,422 A | * | 7/1999 | Yamanaka et al. | 422/121 |
| 6,006,858 A | * | 12/1999 | Shima et al. | 181/210 |
| 6,019,189 A | * | 2/2000 | Shima et al. | 181/210 |
| 6,200,542 B1 | * | 3/2001 | Poles et al. | 423/210 |
| 6,414,213 B2 | * | 7/2002 | Ohmori et al. | 588/309 |
| 6,692,694 B1 | * | 2/2004 | Curry et al. | 422/28 |
| 6,810,991 B1 | * | 11/2004 | Suzuki | 181/210 |
| 2005/0159309 A1 | * | 7/2005 | Hubbell et al. | 502/439 |

FOREIGN PATENT DOCUMENTS

| | | | |
|---|---|---|---|
| JP | 05039608 A | * | 2/1993 |
| JP | 2002220817 A | * | 8/2002 |
| JP | 2004094065 A | * | 3/2004 |
| JP | 2005282276 A | * | 10/2005 |
| WO | WO 9312298 A1 | * | 6/1993 |

* cited by examiner

Primary Examiner—Edgardo San Martin
(74) Attorney, Agent, or Firm—Anderson Kill & Olick, PC

(57) ABSTRACT

The noise reducing equipment of the present invention is used in combination with a vertically oriented sound barrier wall to reduce the level of noise from a source of sound such as traffic generated on one side of the sound barrier wall and comprises an assembly composed of a predetermined number of interconnected resonant chambers mounted in tandem to said sound barrier wall in a relationship such that the assembly extends from said sound barrier wall on the side thereof opposite the source of sound with the resonant chamber closest to the sound barrier wall having a volumetric area larger than the volumetric area possessed by each of the other resonant chambers and an additional sound barrier section extending from the most distant resonant chamber relative to the location of the sound barrier wall. In addition, at least one external surface of the assembly should be coated with a photo-catalyst comprising titanium dioxide.

9 Claims, 10 Drawing Sheets

Figure 6 Modeling of Acoustic Analysis

NOISE REDUCING EQUIPMENT

FIELD OF INVENTION

This invention relates to the field of sound abatement and more particularly to improved noise reducing equipment for use in combination with a sound barrier such as a wall for reducing the level of noise particularly from traffic sounds.

BACKGROUND OF THE INVENTION

It is known to use a sound barrier wall for reducing and impeding the transmission of sound waves. A sound barrier wall can, for example, be installed alongside an expressway to confine and minimize traffic noise generated by passing automobiles. It is also known to add resonance equipment on top of a sound barrier wall which includes several different type of Helmholtz resonators responsive to selected resonance frequencies of the source of noise to be abated so as to more effectively minimize the noise level at the barrier wall and confine the level of noise to an acceptable level. An arrangement consisting of a combination of a sound barrier wall and resonance equipment is disclosed in Japanese Patent No. P3485552 for reducing noise from e.g. traffic to an acceptable low level. The sound resonance equipment disclosed in this patent publication includes an outer shell which surrounds a plurality of resonant chambers responsive to different resonance frequencies and includes means for mounting the resonance equipment to the top of a vertically installed sound barrier wall to form a substantially uniform arrangement of an equal number of resonant chambers on each opposite side of the sound barrier wall.

Although the sound resonance equipment taught and described in the aforementioned Japanese Patent No. P3485552 is effective for reducing noise the construction and installation requirements to form a substantially uniform arrangement of an equal number of resonant chambers on each opposite side of the sound barrier wall is expensive, difficult to maintain and unsightly in appearance. Less expensive noise reducing equipment which can be more easily installed and maintained without any noticeable decrease in its effectiveness to abate noise is the principal object of the present invention.

SUMMARY OF THE INVENTION

Noise reducing equipment has been discovered in accordance with the present invention for attachment to a sound barrier wall that is at least as effective in reducing noise as compared to the equipment disclosed in the aforementioned Japanese patent publication. The noise reducing equipment of the present invention comprises an assembly composed of a predetermined number of interconnected resonant chambers mounted in tandem to said sound barrier wall in a relationship such that the assembly extends from said sound barrier wall on the side thereof opposite the source of sound with the resonant chamber closest to the sound barrier wall having a volumetric area larger than the volumetric area possessed by each of the other resonant chambers and an additional sound barrier section extending from the most distant resonant chamber relative to the location of the sound barrier wall. In addition, at least one external surface of the assembly should be coated with a photo-catalyst comprising titanium dioxide.

More particularly, the noise reducing equipment of the present invention to be used in combination with a sound barrier wall comprises: an assembly composed of at least three resonant chambers, mounted in tandem and connected to said sound barrier wall such that the assembly of resonant chambers extend from said sound barrier wall from only the side thereof opposite the source of generated sound and at a location adjacent the top end thereof with each of the resonant chambers having a plurality of walls which define a separate volumetric area for each resonant chamber, with the resonant chamber having the largest volumetric area being closets to the sound barrier wall and further comprising a plurality of sections composed of sound absorption material with each section extending in a lateral arrangement between adjacent resonant chambers and being spaced apart from one another to form an opening to each resonant chamber.

It is further preferred that the opening in each resonant chamber be either symmetrically aligned with the top end of the barrier wall or be at an inclined position relative to one another with the opening in the first resonant chamber located adjacent the top end of the sound barrier wall and with the other openings positioned above the top end of the barrier wall.

BRIEF DESCRIPTION OF THE DRAWINGS

Further advantages and objects of the present invention will become apparent from the following detailed description of the preferred embodiment when read in conjunction with the following drawings of which.

DETAILED DESCRIPTION OF THE INVENTION

Figure 1:
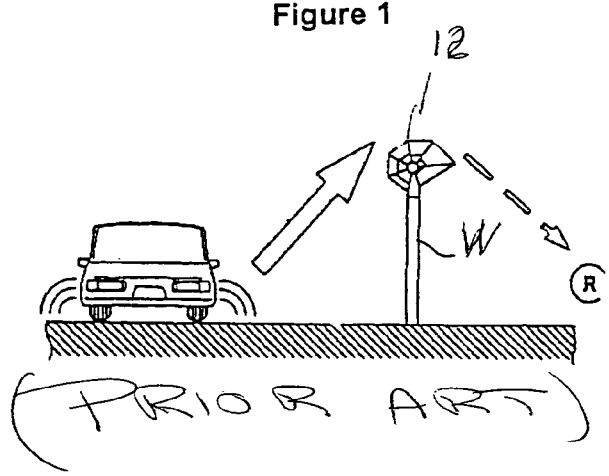
FIG. 1 illustrates a prior art configuration of noise reducing equipment shown mounted upon a vertically oriented sound barrier wall.
Figure 2:
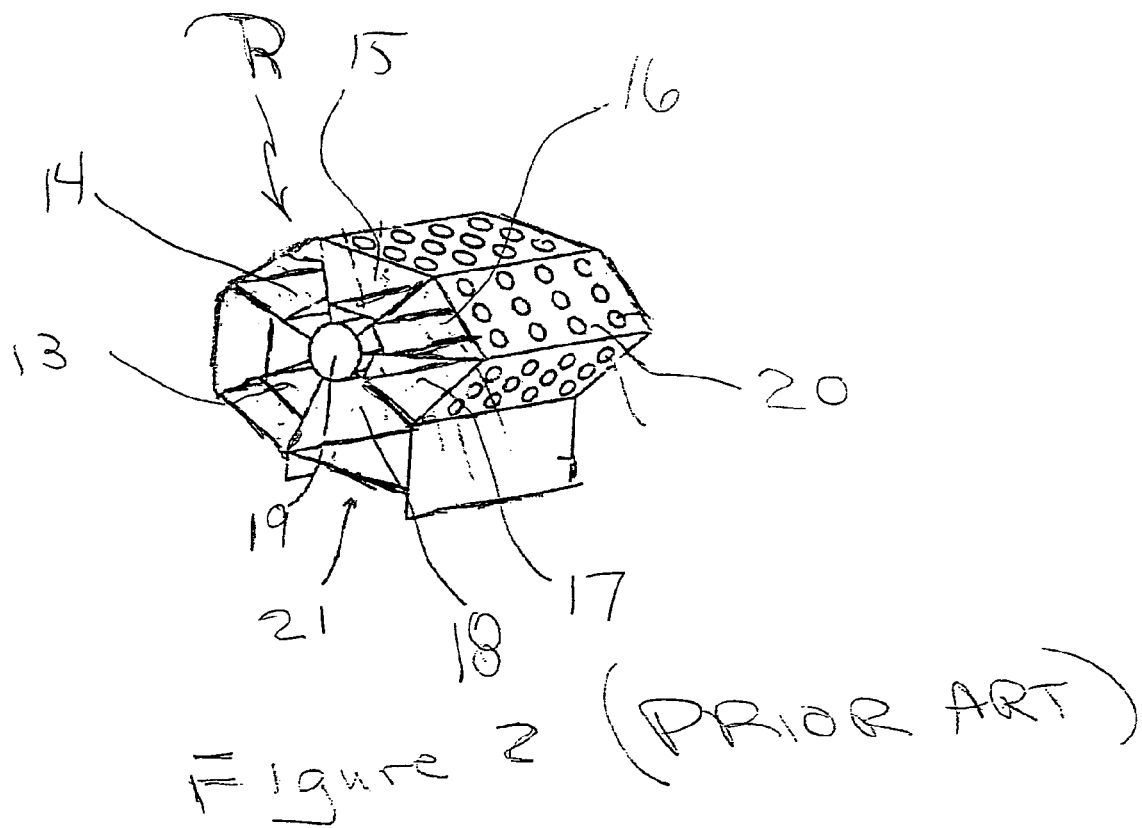
FIG. 2 is an enlarged isometric view of the prior art assembly of resonant chambers in the noise reducing equipment of FIG. 1.
Figure 2:
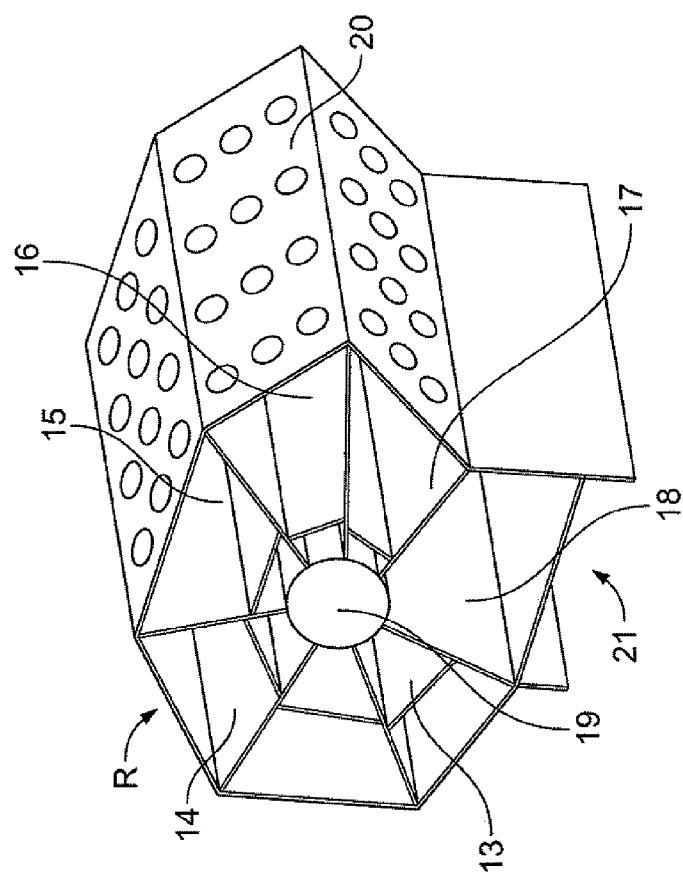

A prior art configuration of noise reducing equipment for traffic noise is shown in FIG. 1 and corresponds to that described in Japanese Patent No. P3485552. FIG. 2 is an enlarged isometric view of the prior art assembly of resonant chambers in the noise reducing equipment of FIG. 1.

The sound barrier wall W is constructed of, for example, concrete and is vertically erected to form a partition between a source of sound such as traffic noise generated from passing automobiles on one side of the vertically oriented sound barrier wall W and an observation point R located on the opposite side of the wall W. A resonator 12, representing an assembly of resonant chambers is mounted on the vertical top end of the sound barrier wall with the resonant chambers arranged to be substantially symmetrically disposed on each opposite side of the sound barrier wall so as to uniformly inhibit the propagation of sound waves at the wall. The propagation of sound waves from a sound source is impeded by the sound barrier wall W and diffracted from the top of the wall W where it enters the resonator 12. Since the noise reducing equipment provides a pre-defined resonance frequency, incident wave and reflecting wave can counterbalance each other at the surface of the resonator 12 when frequency of incident wave matches the resonance frequency causing the phase of reflecting wave from the resonator to be inverted (i.e., the phase is shifted by 180°). The resonance frequency can be pre-defined to correspond to the frequencies of targeted sound waves.

The resonator R is of a configuration as is shown in FIG. 2 defining an arrangement of an even number of resonating chambers, each of which constitutes a separate resonator, with each resonating chamber radially extending from a central core 19. In FIG. 2, six resonating chambers 13, 14, 15, 16, 17 and 18 are shown having a common outer shell 20 covering all of the chambers. The outer shell 20 can be an elastic film with openings or a perforated solid in which the perforations functions as multiple openings to each of the resonating chambers. Each of the resonating chambers is formed of a plurality of separator walls with each defining a different volumetric area and a different resonance frequency or have a common volume and a common resonance frequency. A mounting platform 21 extends vertically from the resonator R to enable the resonator R to be mounted above the top of the sound barrier wall W so that an equal number of resonating chambers will extend from each opposite side of the wall W. In an alternate arrangement disclosed in Japanese Patent Publication No. 2002-220817 the resonating chambers are mounted on opposite sides of the sound barrier wall and aligned in parallel so that the openings to the chambers are level with respect to each other. The resonance frequency of each of the resonators can vary by changing either the volume of the resonant chambers and/or by changing the inner diameters of the inlet openings or holes to the resonant chambers. Alternatively, the resonance frequency can also be varied by using an elastic film membrane for some of the wall dividers and changing the elastic density of the elastic film membrane.

It has been discovered in accordance with the present invention that as long as the assembly of resonant chambers is mounted in tandem to said sound barrier wall and extend from only the side of the barrier wall opposite the source of generated sound with the resonant chamber closest to the sound barrier wall having a volumetric area larger than the volumetric area of each of the other resonant chambers the assembly in combination with a vertically erected sound barrier wall can be as effective in noise reduction as that of a substantially symmetrically mounted noise reduction unit having an equal number of resonant chambers disposed on the opposite sides of the sound barrier wall. Moreover, higher soundproof efficiency can be realized by incorporating sections of sound absorption material between the radiant chambers as illustrated in FIG. 3.

Figure 3:
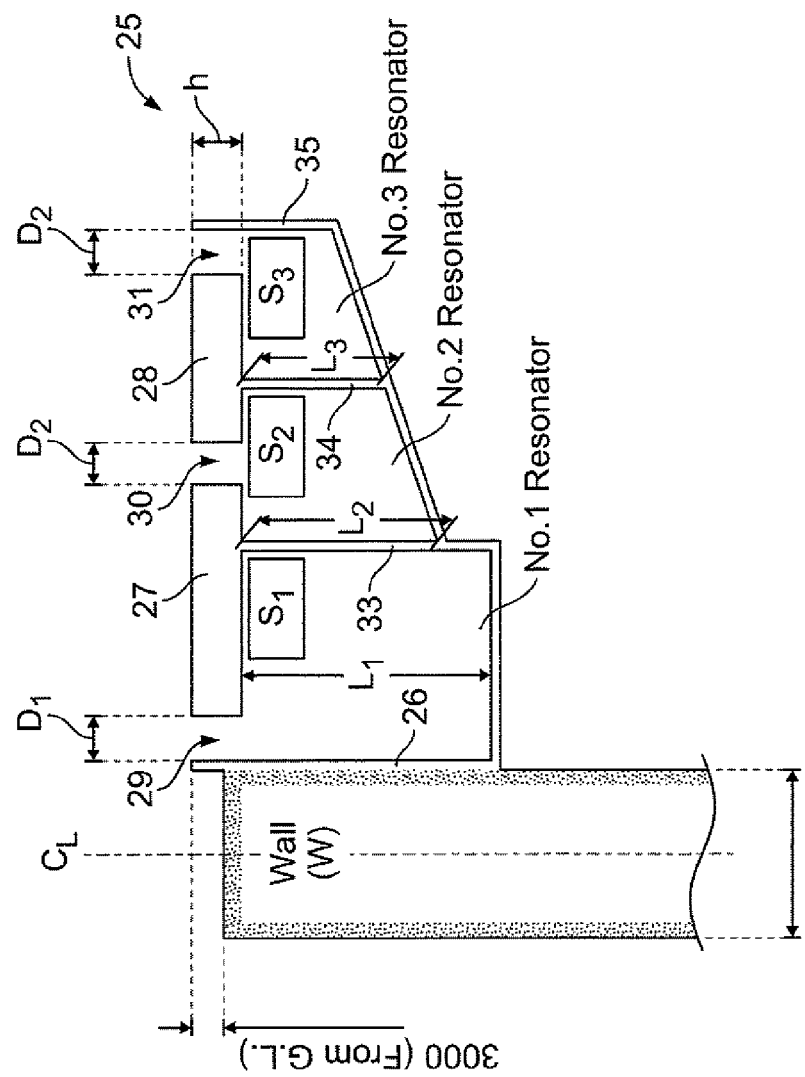
FIG. 3 is a schematic view in cross section of one configuration of the noise reducing equipment of the present invention having an assembly of resonant chambers side mounted against only one side of a vertically oriented sound barrier wall.

The noise reducing equipment of the present invention is illustrated in FIGS. 3-10 inclusive. The structural assembly 25 of resonant chambers as shown in FIG. 3 consists of three resonant chambers which, in combination, form three resonators identified as Resonator No. 1, Resonator No. 2 and Resonator No. 3 respectively. The three resonant chambers are interconnected in tandem and are affixed to the sound barrier wall W so that the assembly extends from only one sound barrier wall surface on the side thereof opposite the source of generated sound. In the arrangement of FIG. 3 the three resonator chambers 1,2 and 3 are side mounted against the sound barrier wall on the side thereof opposite the source of generated sound and are not easily visible from the opposite side. Each resonator includes a plurality of walls and wall separators which define separate volumetric areas $S_1$, $S_2$ and $S_3$ respectively for each of the three resonators 1,2 and 3. The resonator with the largest volumetric area is Resonator No. 1 which includes a wall 26 mounted in parallel alignment against one side of the sound barrier wall W. The wall 26 of Resonator No. 1 provides enhanced structural support for the assembly 25. A plurality of sections 27 and 28 composed of conventional sound absorption material, such as glass wool, extend between adjacent resonant chambers in lateral alignment relative to one another and are spaced apart, such that a plurality of openings 29, 30 and 31 are formed for defining separate inlet openings to each of the resonators No. 1, No. 2, and No. 3 respectively. The width (diameter) and depth (height) of the inlet openings 29, 30 and 31 are variables for controlling the resonance frequency of each of the resonators.

The configuration of FIG. 3 is designed for target frequencies from low to mid range in a bandwidth under 500 Hz. The height "h" of each inlet opening 29, 30 and 31 corresponds to the thickness of the sections 27 and 28 of sound absorption material whereas the diameter "D" or width is also a fixed variable for establishing an aperture ratio between the height and diameter. The resonance frequencies are tuned by changing the length "L" of each Resonator Chamber.

Figure 4:
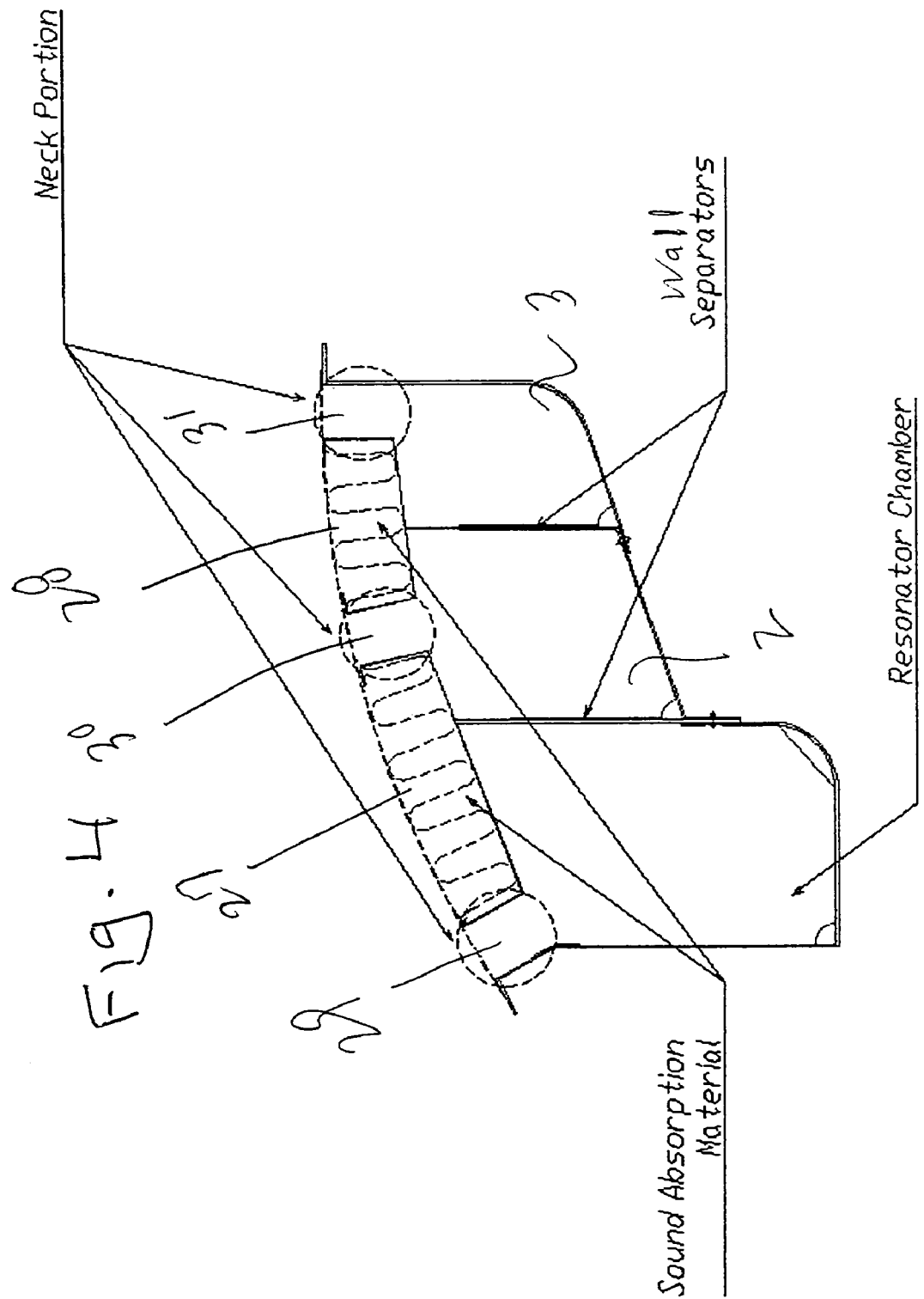
FIG. 4 is a schematic illustration of a variation in the configuration of the assembly of resonant chambers of FIG. 3.
Figure 5:
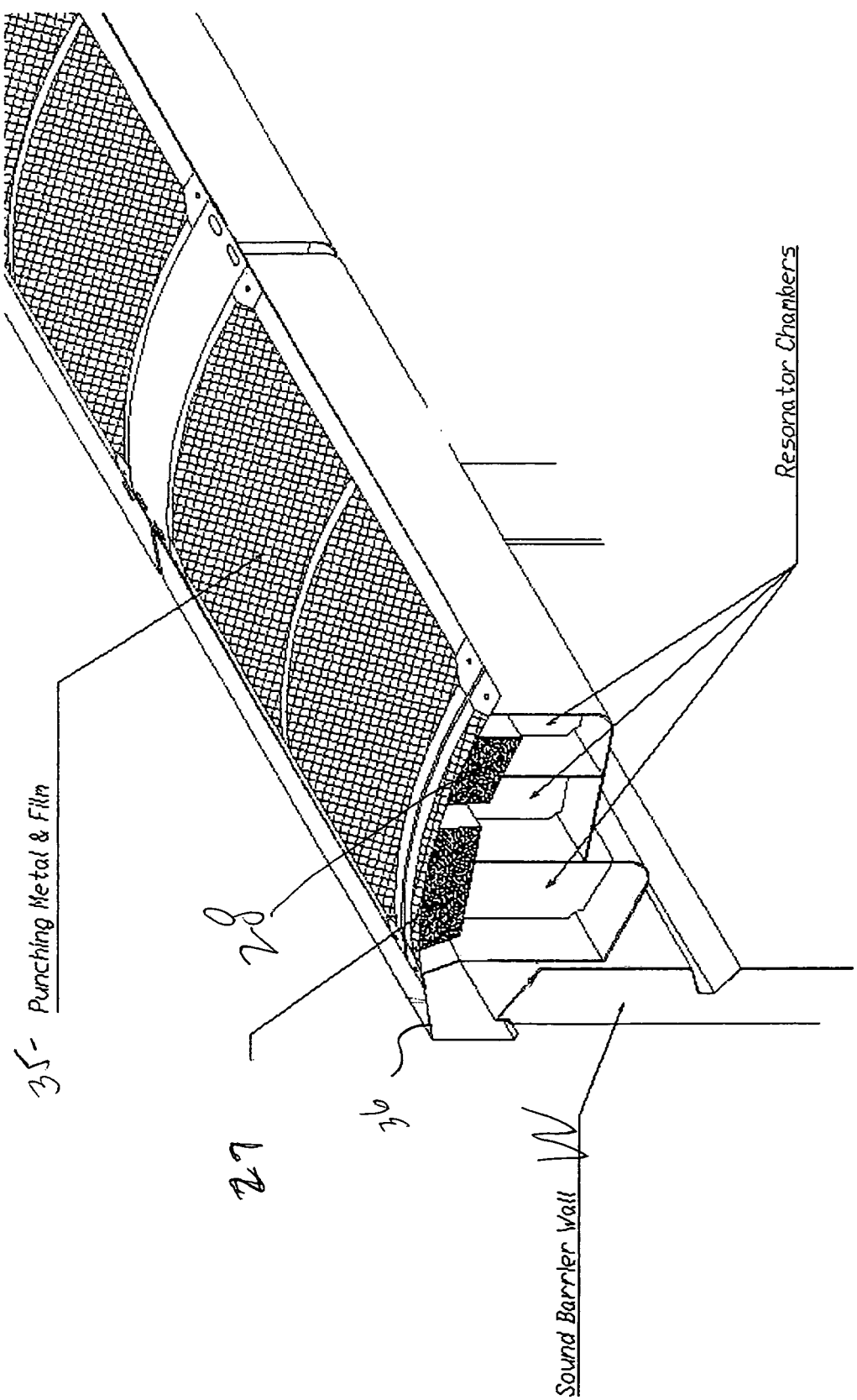
FIG. 5 is an isometric view of a preferred embodiment of the noise reducing equipment of the present invention with the assembly of resonant chambers of FIG. 4 shown mounted in one configuration against one side of a vertically oriented sound barrier wall.

FIG. 4 is a schematic illustration of a variation in the configuration of the assembly of resonant chambers shown in FIG. 3 in which each inlet opening 29, 30 and 31 lies at an increasing height relative to one another with the inlet opening 29 located at substantially the same height as the top end of the sound barrier wall and with each of the other inlet openings 30 and 31 being at a vertically higher level. FIG. 5 is a configuration of an assembly 25 of resonant chambers similar to FIG. 4 which is shown side mounted against one side of a sound barrier wall W and includes an outer shell 35 for covering each the three resonators No. 1, No. 2, and No. 3 in common. The outer shell 35 has an extension 36 mounted upon the top end of the sound barrier wall. The inlet openings 29, 30 and 31 as shown in FIG. 4 constitute the inlet opening neck portions to each of the three resonant chambers 1, 2 and 3 respectively. The sections 27 and 28 of sound absorption material are of a uniform thickness and extend between the adjacent resonant chambers 1,2 and 3 equivalent to the configuration of FIG. 3. However, in this configuration each inlet opening 29, 30 and 31 is at a different vertical level relative to one another equivalent to the arrangement shown in FIG. 4. and the outer shell 35 is shown as a perforated covering but can likewise be solid with or without an elastic film membrane composed preferably from a polyvinyl composition. In the preferred construction as is shown in FIG. 5 the outer shell 35 is a perforated metal composition, the walls of the resonant chambers are formed of aluminum and the sound absorption material 27 and 28 is composed of glasswool.

The following Table 1 shows the configuration of FIG. 3 with the parameters varied to establish different resonance frequencies for four different cases based only on a resonance assembly type without a cover hereafter referred to as "soft". The type of assembly using a cover is either classified as "hard" or "hybrid". In each instance the volumetric area $S_1$ of the first resonator No. 1 is larger than the volumetric area of the other resonators. In the configuration of FIG. 3 the Resonator 1 laterally extends 200 mm from the wall W and each Resonator 2 and 3 laterally extends an additional distance of 145 mm respectively.

TABLE 1

| Type | No. 1 Resonator | | No. 2 Resonator | | No. 3 Resonator | |
|---|---|---|---|---|---|---|
| Soft_1 | $D_1$ | 45 mm | $D_2$ | 40 mm | $D_3$ | 40 mm |
| | $L_1$ | 240 mm | $L_2$ | 190 mm | $L_3$ | 140 mm |
| | $S_1$ | 48000.00 mm² | $S_2$ | 24158.86 mm² | $S_3$ | 16908.87 mm² |
| | $f_{r1}$ | 188.3 Hz | $f_{r2}$ | 271.9 Hz | $f_{r3}$ | 325.0 Hz |
| | | (200 Hz) | | (250 Hz) | | (315 Hz) |
| Soft_2 | $D_1$ | 45 mm | $D_2$ | 40 mm | $D_3$ | 40 mm |
| | $L_1$ | 180 mm | $L_2$ | 190 mm | $L_3$ | 70 mm |
| | $S_1$ | 36000.00 mm² | $S_2$ | 24158.86 mm² | $S_3$ | 8454.43 mm² |
| | $f_{r1}$ | 217.5 Hz | $f_{r2}$ | 271.9 Hz | $f_{r3}$ | 459.6 Hz |
| | | (200 Hz) | | (250 Hz) | | (500 Hz) |
| Soft_3 | $D_1$ | 45 mm | $D_2$ | 40 mm | $D_3$ | 40 mm |
| | $L_1$ | 240 mm | $L_2$ | 190 mm | $L_3$ | 92 mm |

TABLE 1-continued

| Type | No. 1 Resonator | | No. 2 Resonator | | No. 3 Resonator | |
|---|---|---|---|---|---|---|
| | $S_1$ | 48000.00 mm² | $S_2$ | 24158.86 mm² | $S_3$ | 11096.45 mm² |
| | $f_{r1}$ | 188.3 Hz | $f_{r2}$ | 271.9 Hz | $f_{r3}$ | 401.1 Hz |
| | | (200 Hz) | | (250 Hz) | | (400 Hz) |
| Soft_4 | $D_1$ | 45 mm | $D_2$ | 40 mm | $D_3$ | 40 mm |
| | $L_1$ | 122 mm | $L_2$ | 127 mm | $L_3$ | 70 mm |
| | $S_1$ | 24400.00 mm² | $S_2$ | 16105.92 mm² | $S_3$ | 8454.43 mm² |
| | $f_{r1}$ | 264.1 Hz | $f_{r2}$ | 333.0 Hz | $f_{r3}$ | 459.6 Hz |
| | | (250 Hz) | | (315 Hz) | | (500 Hz) |

*The frequencies in "( )" are One-Third Octave Band frequencies.

Figure 6:
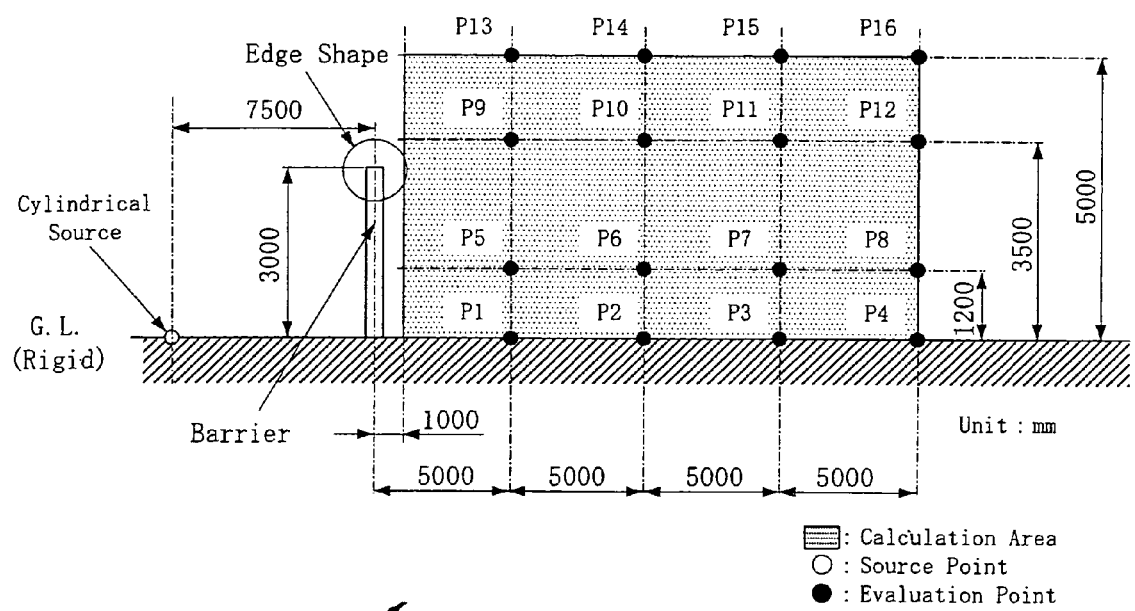
FIG. 6 is an acoustical analysis model of the noise reducing equipment of FIG. 3.

An acoustical analysis model to evaluate the performance of the configuration of FIG. 3 is shown in FIG. 6 at different evaluation points from P1 to P16 respectively. FIG. 6 indicates the evaluation point heights relative to ground level (GL). The following dimensions were used for the acoustical analysis:

Height of the Sound Barrier Wall (W): 3 m
Thickness of the Sound Barrier Wall: 160 mm
Location of the Sound Source: 7.5 m sideward from the center of the sound barrier wall, at the ground level
Computed Region: 1 to 20 m sideward from the sound barrier wall, 0 to 5 m upward from the ground level
Evaluation Points: at 5, 10, 15, 20 m sideward from the center of the sound barrier wall, at 0, 1.2, 3.5, 5 m upward from the ground level (P1 through P16)
Type of Source: Road Traffic Noise Spectrum
Type of Media: Air (Speed of Sound: 340 m/s, Density: 1.225 kg/m³)
Computed Frequency: 100 to 2500 by One-Third Octave Band Noise level and sound pressure reduction level measurements per one-third octave band frequency characteristics were taken at each evaluation point. The overall value of the reduction level at each evaluation point is summarized in the following Table 2.

TABLE 2

Overall values of Noise Reduction Level for each Analyzing Model

| P13 | −0.7 (H) | P14 | −0.4 (H) | P15 | −0.1 (H) | P16 | −0.1 (H) |
|---|---|---|---|---|---|---|---|
| | −0.3 (S_1) | | 0.3 (S_1) | | 0.7 (S_1) | | 0.9 (S_1) |
| | −0.3 (S_2) | | 0.4 (S_2) | | 0.7 (S_2) | | 0.9 (S_2) |
| | −0.3 (S_3) | | 0.4 (S_3) | | 0.8 (S_3) | | 0.9 (S_3) |
| | −0.3 (S_4) | | 0.5 (S_4) | | 0.8 (S_4) | | 1.0 (S_4) |
| P9 | −0.2 (H) | P10 | 0.2 (H) | P11 | 0.1 (H) | P12 | 0.2 (H) |
| | 0.8 (S_1) | | 1.1 (S_1) | | 1.3 (S_1) | | 1.5 (S_1) |
| | 0.8 (S_2) | | 1.1 (S_2) | | 1.2 (S_2) | | 1.3 (S_2) |
| | 0.8 (S_3) | | 1.1 (S_3) | | 1.3 (S_3) | | 1.5 (S_3) |
| | 0.9 (S_4) | | 1.2 (S_4) | | 1.4 (S_4) | | 1.6 (S_4) |
| P5 | 1.6 (H) | P6 | 0.9 (H) | P7 | 0.7 (H) | P8 | 0.6 (H) |
| | 3.6 (S_1) | | 2.5 (S_1) | | 1.8 (S_1) | | 1.4 (S_1) |
| | 3.2 (S_2) | | 2.5 (S_2) | | 1.8 (S_2) | | 1.3 (S_2) |
| | 3.4 (S_3) | | 2.6 (S_3) | | 1.9 (S_3) | | 1.4 (S_3) |
| | 3.2 (S_4) | | 2.9 (S_4) | | 1.8 (S_4) | | 1.3 (S_4) |
| P1 | 2.1 (H) | P2 | 1.1 (H) | P3 | 0.8 (H) | P4 | 0.6 (H) |
| | 3.4 (S_1) | | 2.7 (S_1) | | 2.2 (S_1) | | 1.9 (S_1) |
| | 3.4 (S_2) | | 2.5 (S_2) | | 2.1 (S_2) | | 1.8 (S_2) |
| | 3.4 (S_3) | | 2.7 (S_3) | | 2.2 (S_3) | | 1.9 (S_3) |
| | 3.7 (S_4) | | 2.5 (S_4) | | 2.1 (S_4) | | 1.8 (S_4) |

(H: Hard, S_1: Soft_1, S_2: Soft_2, S_3: Soft_3, S_4: Soft_4)

The average overall values of reduction levels at evaluation points below the height of 1.2 m (i.e. point P1 though P8) are as follows.

Hard: 1.1 dB
Soft_1: 2.4 dB
Soft_2: 2.3 dB
Soft_3: 2.4 dB
Soft_4: 2.4 dB

The overall average level of noise reduction for the same evaluation points for the prior art symmetric type is 3.0 dB whereas the soft type side mounted assembly as indicated above is lower. Therefore, for the higher frequency ranges (1000 Hz or more) the reduction levels for the one-side mounted assembly is smaller than a symmetric two sided mounted type.

However, the overall average level of noise reduction for a hybrid type i.e. with a cover of metal or punched metal in combination with the sections of soundproof material was also determined to be 3.1 dB and 3.0 dB respectively. for the target frequencies (low to mid ranges) are well obtained with one-side mounted type. Accordingly, the hybrid type is preferred over the soft type.

Figure 7:
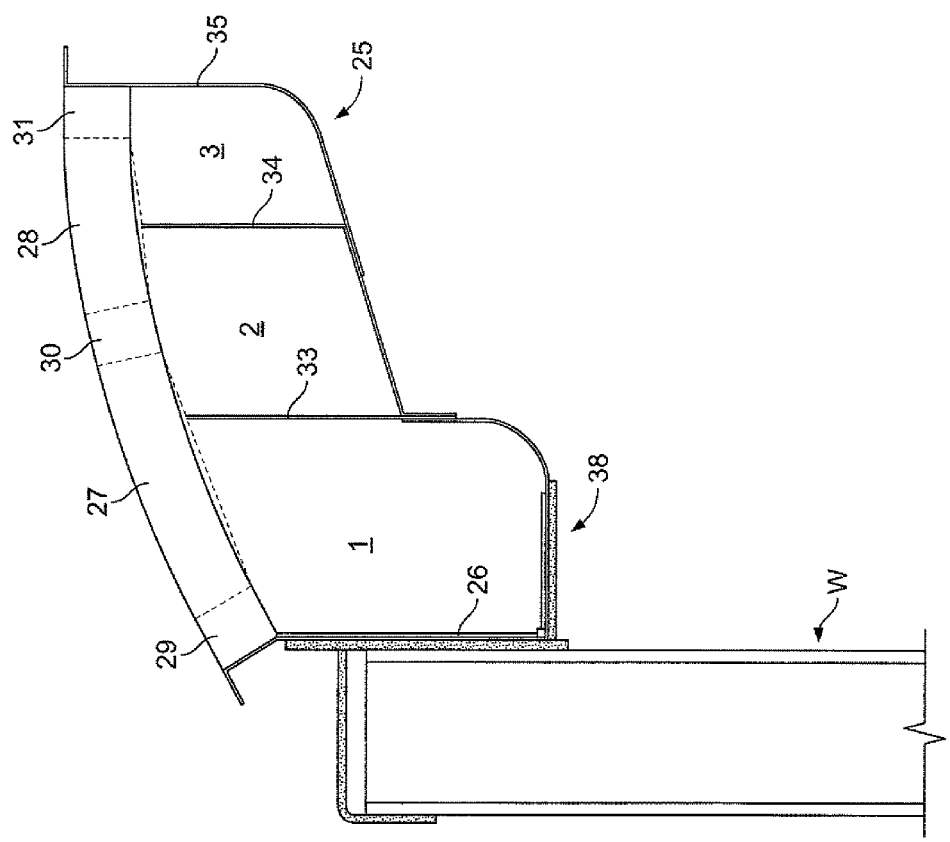
FIG. 7 is a schematic view in cross section of another side mounted configuration for the assembly of resonant chambers of FIG. 4 against one side of a vertically oriented sound barrier wall.
Figure 8:
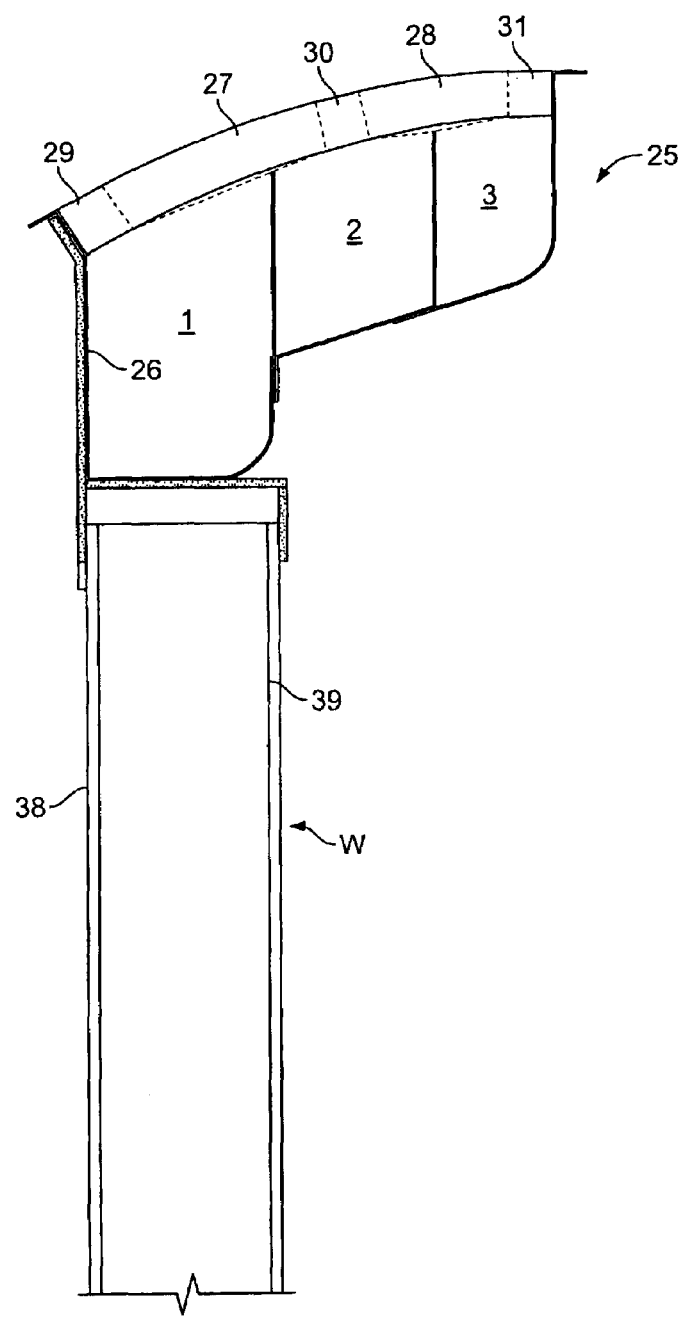
FIG. 8 is a schematic view in cross section of the assembly of resonant chambers of FIGS. 3 and 4 mounted in another configuration to the top end of a vertically oriented sound barrier wall.

FIG. 7 is a schematic view in cross section of the assembly of resonant chambers of FIG. 4 shown side mounted against the sound barrier wall W on one side thereof using additional mounting hardware 37. An alternative mounting arrangement is shown in FIG. 8 in which the assembly 25 of resonant chambers is mounted upon the top end of the vertically oriented sound barrier wall W on the side 38 of the sound barrier wall W facing the source of generated sound and extends outwardly past the opposite side 39 of the sound barrier wall W. The resonant chamber 1 in the assembly 25 having the largest volumetric area has a wall 26 directly mounted to the side 38 of the sound barrier wall W and one or more of the remaining resonant chambers extend from the side 39 of the sound barrier wall opposite the source of generated sound. This configuration is useful when lateral space from the sound barrier wall W is limited.

Figure 9:
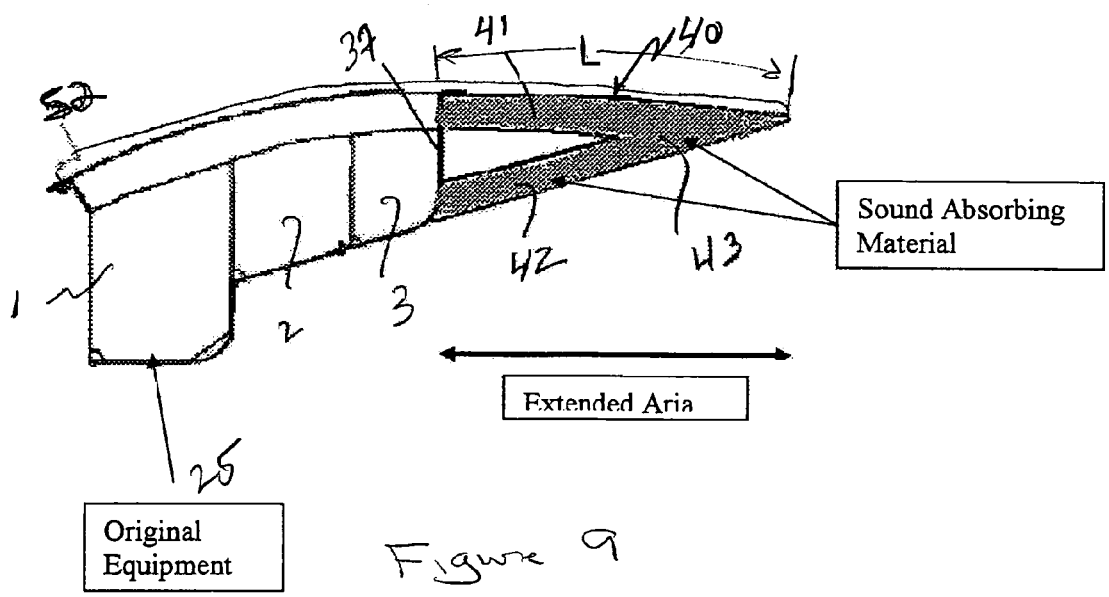
FIG. 9 is another embodiment of the noise reducing equipment present invention formed from an assembly of resonant chambers equivalent to the assembly shown in FIGS. 4 and 5 and an additional sound barrier section extending from the smallest resonant chamber in the assembly to extend the area of effectiveness for reducing sound from the sound barrier wall and FIGS. 10(a) and 10(b) schematically illustrate the increase in the area of effectiveness achieved in sound absorption when using the additional sound barrier section of FIG. 9.

An alternative embodiment of the present invention is shown in FIG. 9, which includes the structural assembly 25 of FIG. 4 and an additional sound barrier section 40 which extends the assembly 25 laterally a distance "L" represented by the length of the sound barrier section 40 in a horizontal direction. The additional sound barrier section 40 provides an extended area of effectiveness to the noise reducing equipment as compared to the area of effectiveness provided by the noise reducing equipment solely with the structural assembly 25. The assembly 25 in FIG. 9 comprises a plurality of resonant chambers 1, 2 and 3 comparable to the arrangement shown in FIG. 4 and may be mounted to the sound barrier wall W as is shown in FIG. 7 or as shown in FIG. 8 respectively.

The additional sound barrier section 40 includes an extended first portion 41 which increases the sound barrier protection of the structural assembly 25 and a second portion 42 which is connected to the first portion 41 forming a common end 43. The first and second portions 41 and 42 intersect to form an acute angle at the common end 43 with each portion 41 and 42 being connected at the opposite end thereof to the outer wall 37 of the outermost resonant chamber 3. The extended first portion 41 should be formed from sound absorbing material equivalent to the sound absorbing material of section 28 in FIGS. 4, 5 and 7 and may also be comparable thereto in thickness and geometry. The second portion may likewise be of a similar material composition and geometry to that of the first portion 41. The first portion 41 is arranged in alignment with section 28 of the structural assembly 25 to laterally extend the length of the structural assembly 25 a distance equal to "L" to form an extended region of sound barrier protection over an enlarged area. An outer cover or shell 52 similar to the cover 35 of FIG. 5 may be placed over the assembly 25 and the extended sound barrier 40 for protection against inclement conditions.

As is shown in FIG. 4 and in FIG. 9 each of the resonant chambers 1, 2 and 3 have upright wall dividers which separate the resonant chambers from one another and from the sound barrier wall W. The upright wall divider 26 in resonant chamber 1, as is shown in FIG. 7, is mounted against the sound barrier wall W on one side thereof. The wall divider 33 separates the resonant chambers 1 and 2 and the wall divider 34 separates the resonant chambers 2 and 3. The sound barrier section 27 extends between the first and second resonant chambers 1 and 2 and engages the wall divider 33 whereas the sound barrier section 28 extends between the send and third resonant chambers 2 and 3 and engages the wall divider 34.

Figure 10A:
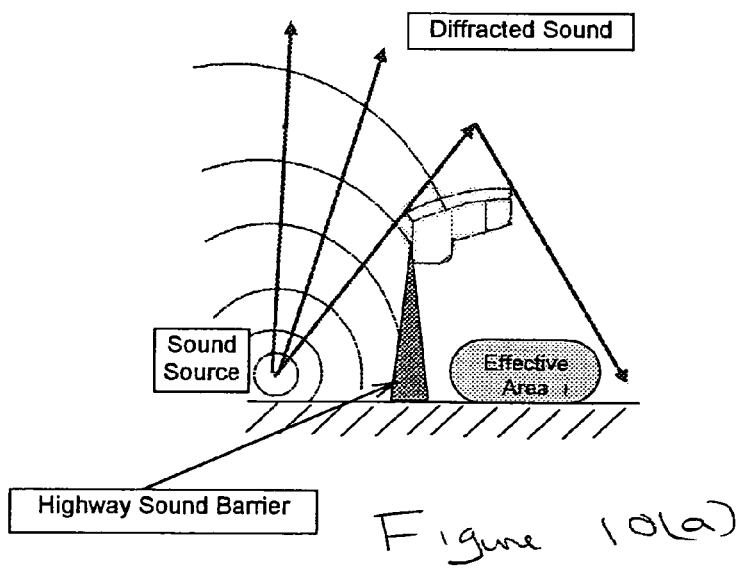
Figure 10B:
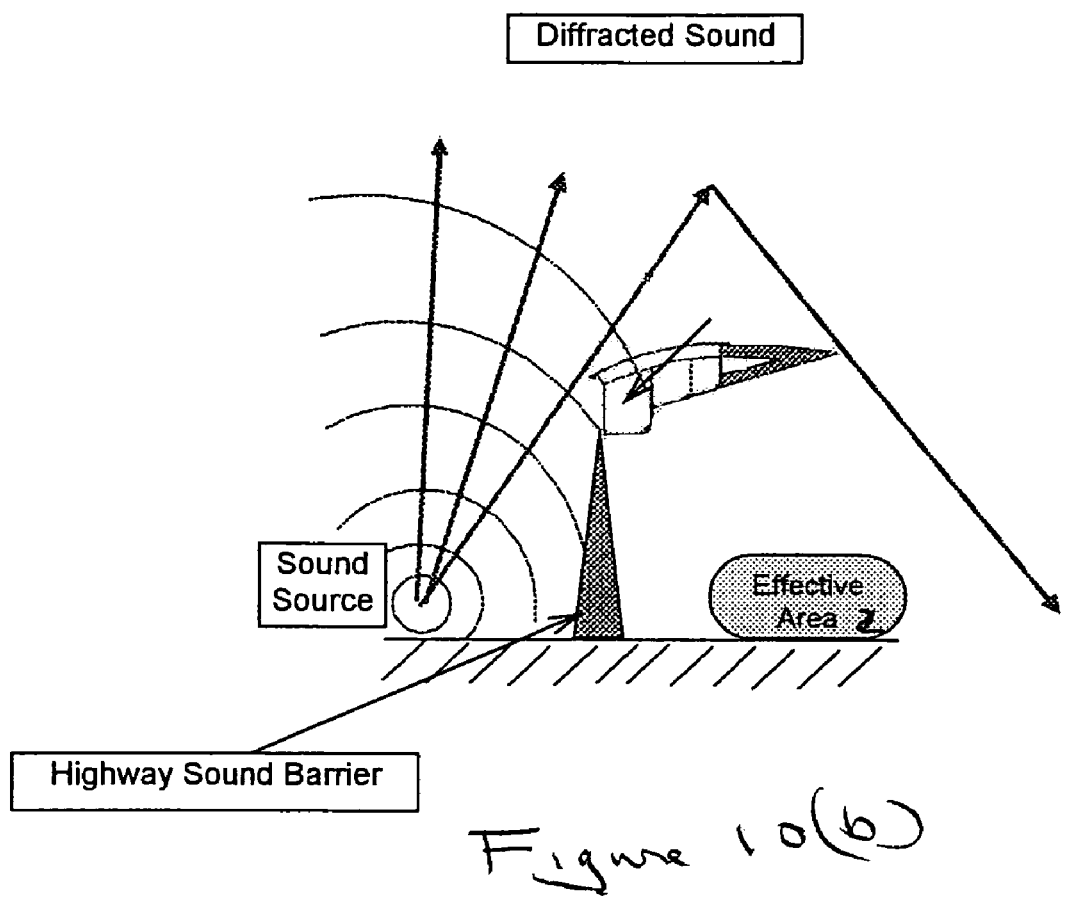

In accordance with the alternative embodiment of FIG. 9 the sound barrier section 40 extends the structural assembly 25 a distance equal to "L" to form an extended region of sound barrier protection extending the area of effectiveness for sound absorption as is more clearly evident from FIGS. 10(a) and 10(b) which represent a comparison illustration of the area of effectiveness identified as Effective Area 1 for the noise reducing equipment with the structural assembly 25 alone as compared to the area of effectiveness identified as Effective Area 2 for the noise reducing equipment with the structural assembly 25 in combination with the sound barrier section 40 both measured relative to the position of the highway sound barrier wall W and the sound source. As schematically illustrated in FIGS. 10(a) and 10(b) the source of sound generates sound waves which emanate from the sound source as shown by the circular lines displaced from one another surrounding the sound source. The sound waves have a characteristic called "diffraction". The diffracted sound is shown in FIG. 10 represented by radial lines extending from the sound source. The added sound barrier section 40 absorbs sound over a greater distance which increases the effective area of sound absorption to an Effective Area 2 as shown in FIG. 10(b) relative to the Effective Area 1 shown in FIG. 10(a).

A further improvement to the noise reducing equipment of the present invention is based upon coating at least one external surface of the noise reducing equipment with a photo-catalyst composition composed exclusively or substantially of titanium dioxide. Preferably all of the external surfaces include a surface coating of photo-catalyst. More particularly, if an outer shell 52 is used, the outer shell may be coated with a photo-catalyst surface to keep the structural assembly clean and to keep both sides of the highway sound barrier wall W clean. A photo-catalyst coating of titanium dioxide has hydrophilic properties which is an advantage during winter use in cold climates and will prevent the accumulation of snow.

It is also preferable in accordance with the present invention for the resonant chambers in the structural assembly 25 to be composed of aluminum which are preferably formed by extrusion so that the structural assembly 25 can be machined and the resonant chambers 1, 2 and 3 formed using a jig. Holes may be punched into the assembly 25 where needed using a punch machine for mounting attachment hardware.

What is claimed is:

1. Noise reducing equipment for use in combination with a vertically oriented sound barrier wall having a top end and opposite sides for reducing the noise generated from a source of sound located on one of the sides of the sound barrier wall comprising an assembly composed of a predetermined number of interconnected resonant chambers mounted in tandem to said sound barrier wall in a relationship such that the assembly extends from said sound barrier wall on the side thereof opposite the source of sound with the resonant chamber closest to the sound barrier wall having a volumetric area larger than the volumetric area possessed by each of the other resonant chambers and further comprising an additional sound barrier section extending from the most distant resonant chamber relative to the location of the sound barrier wall with the sound barrier section being of a length sufficient to further extend the noise reducing equipment a predetermined distance laterally from the sound barrier wall on the side thereof opposite the source of sound.

2. Noise reducing equipment as defined in claim 1 wherein said additional sound barrier section comprises a first portion and a second portion each having one end intersecting at a common point and with the opposite end connected to said resonant chamber furthest from said barrier wall.

3. Noise reducing equipment as defined in claim 2 wherein each of the resonant chambers have an upright wall divider for separating one resonant chamber from the other and wherein said first portion engages the upright wall of the resonant chamber furthest from the sound barrier wall and extends outwardly therefrom to increase the effective area of sound absorption of said noise reducing equipment.

4. Noise reducing equipment as defined in claim 2 further comprising a plurality of sections composed of sound absorption material connected to each of the upright wall dividers with each section extending laterally between adjacent resonant chambers and being spaced apart from one another to form an opening to each resonant chamber.

5. Noise reducing equipment as defined in claim 4 wherein said first portion comprises a section of sound absorption material extending laterally from the section of sound absorption material connected to the upright wall divider in the resonant chamber furthest from the sound barrier wall.

6. Noise reducing equipment as defined in claim 1 wherein said assembly has at least one external surface coated with a photo-catalyst comprising titanium dioxide.

7. Noise reducing equipment as defined in claim 6 further comprising a common outer covering extending over all of said resonant chambers having said photo-catalyst material on the exterior thereof.

8. Noise reducing equipment as defined in claim 1 wherein said assembly of resonant chambers are side mounted in tandem with the resonant chamber of largest volumetric area mounted on one side of the sound barrier wall located opposite the source of generated sound.

9. Noise reducing equipment as defined in claim 1 wherein said assembly of resonant chambers are connected to said sound barrier wall with the resonant chamber having the largest volumetric area mounted in substantial vertical alignment with the wall of the sound barrier on the side thereof nearest to the source of sound and with the remaining resonant chambers extending outwardly from the wall of the sound barrier wall opposite the source of generated sound.

* * * * *